United States Patent
Yoon et al.

(10) Patent No.: US 10,446,334 B2
(45) Date of Patent: Oct. 15, 2019

(54) ELECTRICAL ENERGY STORAGE APPARATUS HAVING IMPROVED COUPLING STRUCTURE OF INTERNAL TERMINAL

(71) Applicant: LS Mtron Ltd., Anyang-si, Gyeonggi-do (KR)

(72) Inventors: Yu-Il Yoon, Seoul (KR); Ha-Young Lee, Suwon-si (KR); Sang-Hyun Bae, Anyang-si (KR); Dong-Il Shin, Suwon-si (KR); Hyun-Seok Ko, Gunpo-si (KR); Kyeong-Hoon Park, Ansan-si (KR); Ho-Lim Kang, Seoul (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/543,650

(22) PCT Filed: Jan. 8, 2016

(86) PCT No.: PCT/KR2016/000181
§ 371 (c)(1),
(2) Date: Jul. 14, 2017

(87) PCT Pub. No.: WO2016/114529
PCT Pub. Date: Jul. 21, 2016

(65) Prior Publication Data
US 2017/0372848 A1    Dec. 28, 2017

(30) Foreign Application Priority Data

Jan. 14, 2015    (KR) .................. 10-2015-0006839

(51) Int. Cl.
*H01G 11/72*    (2013.01)
*H01G 11/76*    (2013.01)
(Continued)

(52) U.S. Cl.
CPC ............. *H01G 11/72* (2013.01); *H01G 11/76* (2013.01); *H01G 11/82* (2013.01); *H01M 2/263* (2013.01);
(Continued)

(58) Field of Classification Search
CPC ........ H01G 11/12; H01G 11/22; H01G 11/72; H01G 11/76
See application file for complete search history.

(56) References Cited

U.S. PATENT DOCUMENTS 6,456,484 B1 * 9/2002 Matsuoka ................ H01G 9/06
361/502
6,813,139 B2 * 11/2004 Bendale ................... H01G 9/06
361/502
(Continued)

FOREIGN PATENT DOCUMENTS

CN     202887989 U    4/2013
EP     2211400 A1     7/2010
(Continued)

OTHER PUBLICATIONS

Search Report, dated Apr. 29, 2016, for International Application No. PCT/KR2016/000181.
(Continued)

*Primary Examiner* — Eric W Thomas
(74) *Attorney, Agent, or Firm* — K&L Gates LLP (57) ABSTRACT

An electric energy storage device in which a cell assembly having electrode leads is installed in a metal case. The electric energy storage device includes an internal terminal formed with a support, connection ribs and thorough portions, and the electrode leads include a part of electrode leads compressed by the support and the connection ribs of
(Continued)

the internal terminal and a part of electrode leads located at the thorough portions of the internal terminal to maintain a shape thereof.

3 Claims, 8 Drawing Sheets

(51) Int. Cl.
    *H01G 11/82*     (2013.01)
    *H01M 2/26*     (2006.01)
    *H01M 4/70*     (2006.01)
    *H01M 10/04*     (2006.01)
    *H01G 11/12*     (2013.01)
    *H01M 2/36*     (2006.01)

(52) U.S. Cl.
    CPC ......... *H01M 4/70* (2013.01); *H01M 10/0431* (2013.01); *H01G 11/12* (2013.01); *H01M 2/36* (2013.01); *Y02E 60/13* (2013.01); *Y02T 10/7022* (2013.01)

(56) References Cited

U.S. PATENT DOCUMENTS

| | | | |
|---|---|---|---|
| 7,332,246 B2 * | 2/2008 | Wiepen | H01M 2/263 429/122 |
| 7,457,102 B2 * | 11/2008 | Miura | H01G 9/008 361/518 |
| 8,488,301 B2 | 7/2013 | Wetherill et al. | |
| 8,817,453 B2 | 8/2014 | Chun et al. | |
| 9,159,504 B2 | 10/2015 | Paeng et al. | |
| 2002/0110729 A1 * | 8/2002 | Hozumi | H01G 4/32 429/130 |
| 2014/0308554 A1 | 10/2014 | Khakhalev | |

FOREIGN PATENT DOCUMENTS

| | | | | |
|---|---|---|---|---|
| JP | 6116862 U | 1/1986 | | |
| JP | 2000188236 A | 7/2000 | | |
| JP | 2000-269099 A | 9/2000 | | |
| JP | 2009110751 A | 5/2009 | | |
| JP | 2014-131035 A | 7/2014 | | |
| JP | WO 2015098865 A1 * | 7/2015 | ............ | H01G 11/66 |
| KR | 10-2004-0089260 A | 10/2004 | | |
| KR | 10-2008-0028582 A | 4/2008 | | |
| KR | 10-2010-0062279 A | 6/2010 | | |
| KR | 10-2010-0099454 A | 9/2010 | | |
| KR | 10-1159652 B1 | 6/2012 | | |
| KR | 10-1296224 B1 | 9/2013 | | |
| KR | 10-2014-0007868 A | 1/2014 | | |

OTHER PUBLICATIONS

Written Opinion, dated Apr. 29, 2016, for International Application No. PCT/KR2016/000181.

* cited by examiner

ELECTRICAL ENERGY STORAGE APPARATUS HAVING IMPROVED COUPLING STRUCTURE OF INTERNAL TERMINAL

CROSS-REFERENCE TO RELATED APPLICATION(S)

The present application is a U.S. National Phase entry from International Application No. PCT/KR2016/000181, filed Jan. 8, 2016, which claims priority to Korean Patent Application No. 10-2015-0006839, filed Jan. 14, 2015, the disclosure of which is incorporated by reference herein in its entirety.

BACKGROUND OF THE INVENTION

1. Field of the Invention

The present disclosure relates to an electric energy storage device, and more particularly, to an electric energy storage device having a structure capable of improving electrolyte impregnation and internal gas discharging performance.

2. Description of Related Art

A high capacitance storage device, which is regarded as a next-generation electric energy storage device, includes a ultra-capacitor (UC), a super capacitor (SC), an electric double layer capacitor (EDLC) and the like, which are a kind of capacitor, and it is an energy storage device having an intermediate property between an electrolytic condenser and a secondary battery, which can be used in combination with, or in place of, a secondary battery due to its high efficiency and semi-permanent life span.

The high capacitance storage device is sometimes used in place of a battery for applications which do not ensure easy maintenance and demand long service life. The high capacitance storage device has fast charging/discharging characteristics and thus is very suitable not only as an auxiliary power source for mobile communication information devices such as a mobile phone, a notebook and a PDA but also as a main or auxiliary power source of an electric vehicle, a night road pilot lamp, an uninterrupted power supply (UPS) and the like, which demand high capacity, and is widely used for such purposes.

Figure 1:
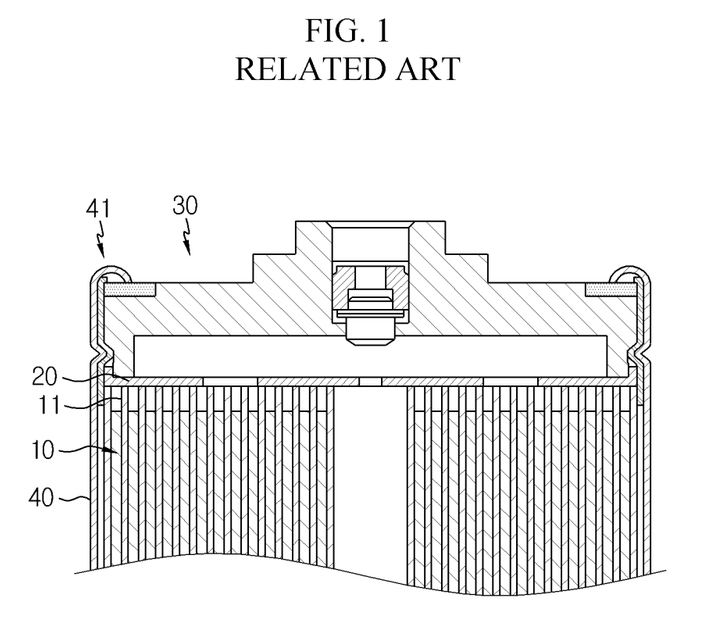
FIG. 1 is a partial cross-sectional view showing an electric energy storage device of an existing technique.

The high capacitance storage device generally has a cylindrical shape as shown in FIG. 1 for a small size.

Referring to FIG. 1, a high capacitance storage device includes a jelly-roll-type cell assembly 10 in which a positive electrode plate and a negative electrode plate are would with a separator being interposed therebetween, and a metal case 40 accommodating the cell assembly 10, an internal terminal 20 disposed at upper and lower internal sides of the metal case 40 and connected to the negative electrode plate and the positive electrode plate of the cell assembly 10, respectively, and an external terminal 30 coupled to the outside of the internal terminal 20.

Figure 2:
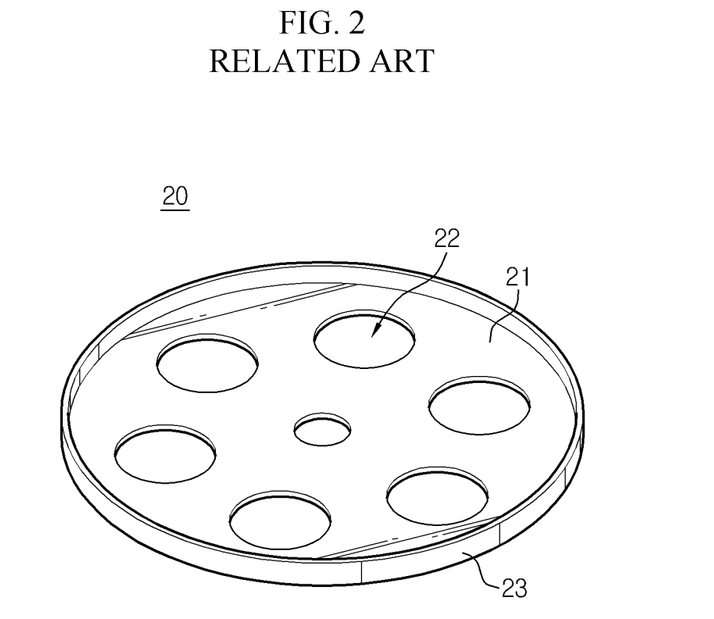
FIG. 2 is a perspective view showing an appearance of an internal terminal depicted in FIG. 1.

In the high capacitance storage device, as shown in FIG. 2, the internal terminal 20 has a plurality of internal impregnation holes 22 formed in a plane 21 thereof and has a plate shape with a circular outer circumference. A flange 23 extending vertically is provided at an edge of the internal terminal 20 so as be coupled to an edge of the external terminal 30.

When the internal terminal 20 is disposed inside the metal case 40, the upper surface of the plane 21 comes into contact with the lower portion of the external terminal 30 and the lower surface of the plane 21 comes into contact with an electrode lead 11 exposed out of the cell assembly 10.

Generally, in a high capacitance storage device, a side reaction occurs at an interface between an electrolyte and an electrode when an abnormal operation such as overcharge, overdischarge and overvoltage takes place at room temperature, thereby generating gas as a byproduct. If the gas is generated and accumulated inside, the internal pressure of the metal case 40 continuously increases, and eventually the metal case 40 is swelled convexly or gas is discharged abruptly at a weak portion of the metal case 40 to cause explosion.

In relation to the swelling phenomenon of the metal case 40, a curling portion 41 bent toward the external plate 30 is formed at the upper end of the metal case 40.

However, in the existing high capacitance storage device, since the internal terminal of a plate shape is compressed on the entire leads, a channel is not properly secured and the internal gas release performance is poor. Thus, even though the curling portion 41 is provided as above, it is difficult to effectively cope with an increased internal pressure of the metal case 40.

In addition, when the existing internal terminal 20 is coupled to the cell assembly 10, the lower surface of the internal terminal 20 is compressed onto the entire electrode leads 11, which disturbs impregnation of the electrolyte and thus does not ensure smooth impregnation. This problem is more severe when a high-viscosity electrolyte is used.

SUMMARY OF THE INVENTION

The present disclosure is designed to solve the problems of the related art, and therefore the present disclosure is directed to providing an electric energy storage device, which may allow a part of electrode leads not to be compressed when an internal lead is connected to the electrode lead but to maintain the shape of the electrode leads, thereby improving electrolyte impregnation and internal gas release performance.

In one aspect of the present disclosure, there is provided an electric energy storage device in which a cell assembly having electrode leads is installed in a metal case, the electric energy storage device comprising: an internal terminal formed with a support, connection ribs and thorough portions so that lower surfaces of the support and the connection ribs come into contact with a part of the electrode leads, wherein the electrode leads include a part of electrode leads compressed by the support and the connection ribs of the internal terminal and a part of electrode leads located at the thorough portions of the internal terminal to maintain a shape thereof.

The support may be located at a center of the internal terminal, and the connection ribs may be arranged at a periphery of the support at regular intervals with a rod shape.

An electrolyte impregnation hole may be formed at a center of the support.

The electric energy storage device according to the present disclosure may further comprise at least one reinforcing rib extending in a circumferential direction of the internal terminal to connect the connection ribs to each other.

The electrode leads may be compressed after cutting a portion thereof corresponding to the connection ribs.

The plurality of connection ribs may have flanges formed at ends thereof to correspond to an inner wall of the metal case.

A contact area of the internal terminal, which comes into contact with the electrode leads, is 60% or above of an entire sectional area of the electrode leads.

Advantageous Effects

According to the present disclosure, when the internal terminal and the electrode leads are coupled, the shape of the electrode leads is partially maintained to ensure smooth impregnation of the electrolyte, thereby greatly improving the electrolyte impregnation and enhancing the internal gas release performance.

In addition, the area of the electrode leads where the shape is maintained and the contact resistance thereof may be easily controlled by means of the structure of a connection rib of the internal terminal.

BRIEF DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION OF THE INVENTION

Figure 3:
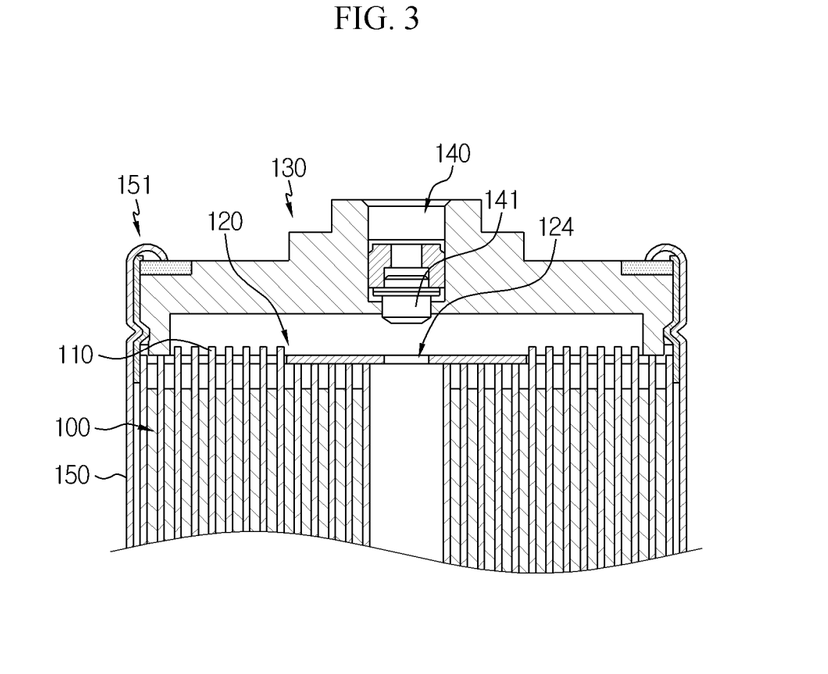
FIG. 3 is a partial cross-sectional view showing an electric energy storage device according to an embodiment of the present disclosure.

FIG. 3 is a cross-sectional view showing an electric energy storage device according to an embodiment of the present disclosure.

Referring to FIG. 3, the electric energy storage device according to an embodiment of the present disclosure includes a cell assembly 100, a cylindrical metal case 150 accommodating the cell assembly 100, an internal terminal 120 disposed inside an end of the metal case 150 and connected to the cell assembly 100 and having a radial body, and an external terminal 130 exposed to the outside in contact with the internal terminal 120.

The cell assembly 100 may adopt a general cell for an ultra-capacitor, in which a positive electrode plate and a negative electrode plate are wound together with a separator being interposed therebetween to form a jelly-roll shape. Electrode leads 110 respectively connected to the positive electrode plate and the negative electrode plate are located at both end surfaces of the cell assembly 100.

The metal case 150 has a cylindrical body with an internal space for accommodating the cell assembly 100. Preferably, the metal case 150 may be provided using an aluminum cylinder.

The internal terminal 120 connected to the electrode leads 110 of the cell assembly 100 is disposed adjacent to both longitudinal ends of the metal case 150, and the external terminal 130 coming into contact with the internal terminal 120 is disposed outside the internal terminal 120. Though FIG. 3 shows only the internal terminal 120 and the external terminal 130 disposed at the upper side of the metal case 150, an internal terminal and an external terminal are also provided at the lower side of the metal case 150.

The external terminal 130 is exposed out of the metal case 150 and has a circular outer circumferential surface corresponding to the inner circumferential surface of the metal case 150, and its overall shape may be configured with various three-dimensional shapes.

A hollow 140 extending in a thickness direction is formed at the center of the upper external terminal 130. The hollow 140 is used, for example, as a space for installing an automatic reset safety valve 141 as well as a path for injecting an electrolyte and an air vent for vacuum operation.

A curling portion 151 is provided at the upper end of the metal case 150 near the external terminal 130, and the curling portion 151 is formed to slightly curl toward the inside of the metal case 150 and prevents the external terminal 130 from being deviated.

Figure 4:
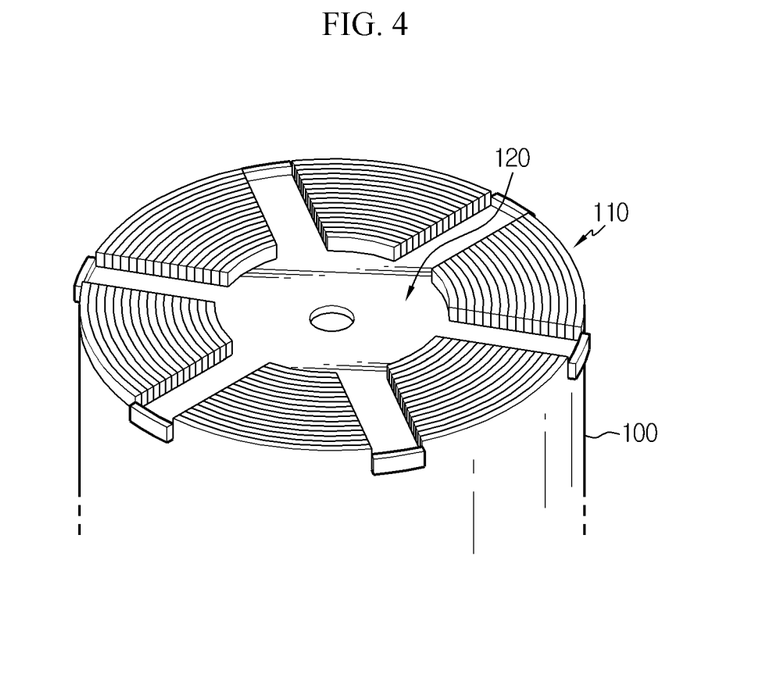
FIG. 4 is a perspective view showing a coupling relation between the internal terminal and leads, depicted in FIG. 3.

As shown in FIG. 4, the internal terminal 120 is coupled to the cell assembly 100. In other words, the internal terminal 120 is disposed on the cell assembly 100 and is compressed by and welded to some electrode leads 110, while allowing other some electrode leads 110 to pass therethrough in the thickness direction of the body so as to maintain the shape thereof. The degree of compression of the electrode leads 110 and the thickness of the internal terminal 120 determine a top position of the electrode leads 110 which moves up through the internal terminal 120. Accordingly, the upper end of the electrode leads 110 moving up through the internal terminal 120 may be positioned higher than the upper surface of the internal terminal 120, or may be positioned at the same point as or a slightly lower point than the upper surface of the internal terminal 120.

Figure 5:
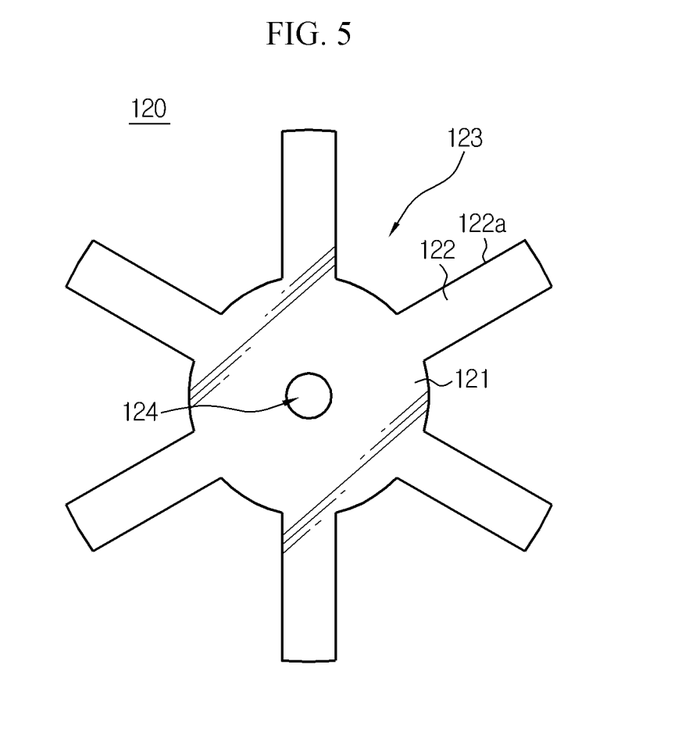
FIG. 5 is a bottom view showing the internal terminal depicted in FIG. 3.
Figure 6:
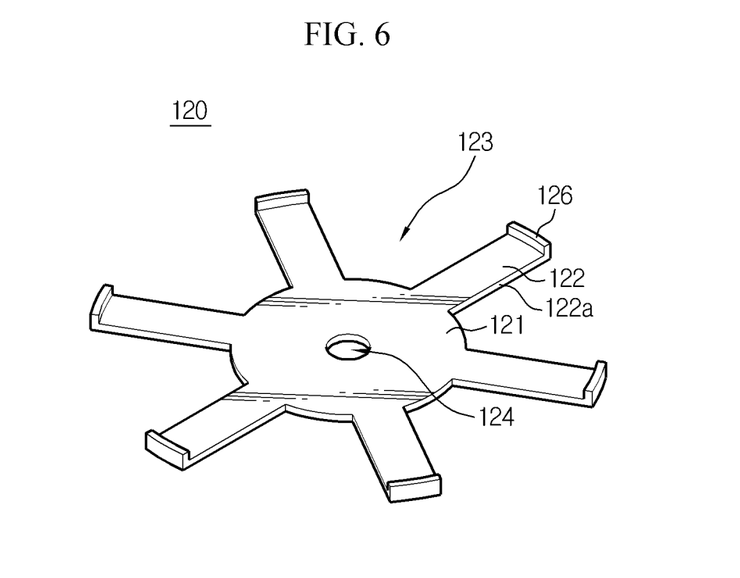
FIG. 6 is a perspective view of FIG. 5.

In order to implement the coupling relation between the internal terminal 120 and the electrode leads 110, as shown in FIGS. 5 and 6, the internal terminal 120 includes a support 121 of a predetermined shape and a plurality of connection ribs 122 extending radially from the support 121. Preferably, the support 121 and the connection ribs 122 are integrally formed using a metal plate.

The support 121 has a plate-shaped body of a predetermined shape with an electrolyte impregnation hole 124 formed at the center thereof.

Each connection rib 122 is in the form of a bar, and the connection ribs 122 are arranged at regular intervals around the support 121 such that the bottom of the support 121 and the plurality of connection ribs 122 are in contact with a part of the electrode leads 110.

Empty spaces 123 are naturally formed between the connection ribs 122 due to the structure in which the plurality of connection ribs 122 are radially arranged at predetermined intervals. The empty space 123 serves as a thorough portion 127 (see FIG. 11) that maintains the shape of some electrode leads 110 when the internal terminal 120 is coupled to the electrode leads 110. In other words, the empty space 123 is the thorough portion 127.

The internal terminal 120 has a flange 126 formed to extend vertically upward so that the end of the connection rib 122 corresponds to the inner wall of the cylindrical metal case 150. The flange 126 is tightly coupled by wrapping the lower edge of the external terminal 130.

Figure 7:
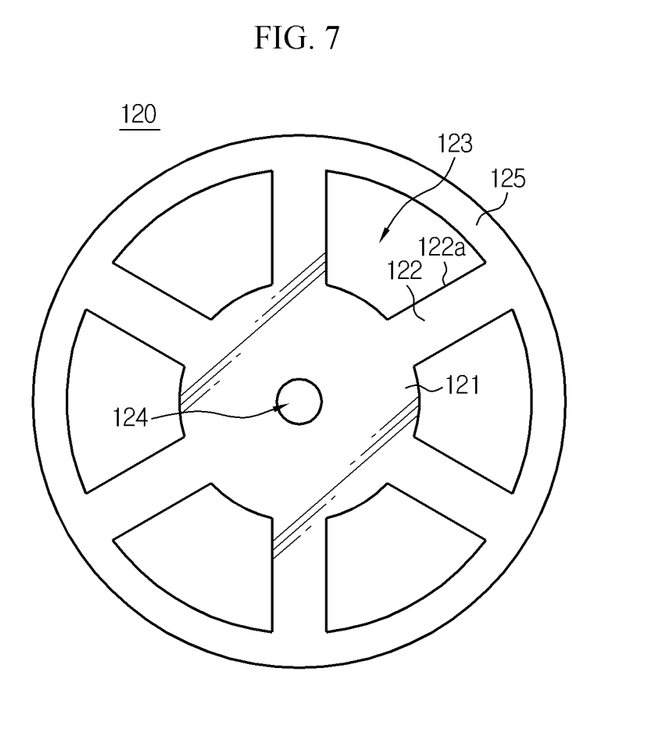
FIG. 7 is a bottom view showing a modification of FIG. 5.
Figure 8:
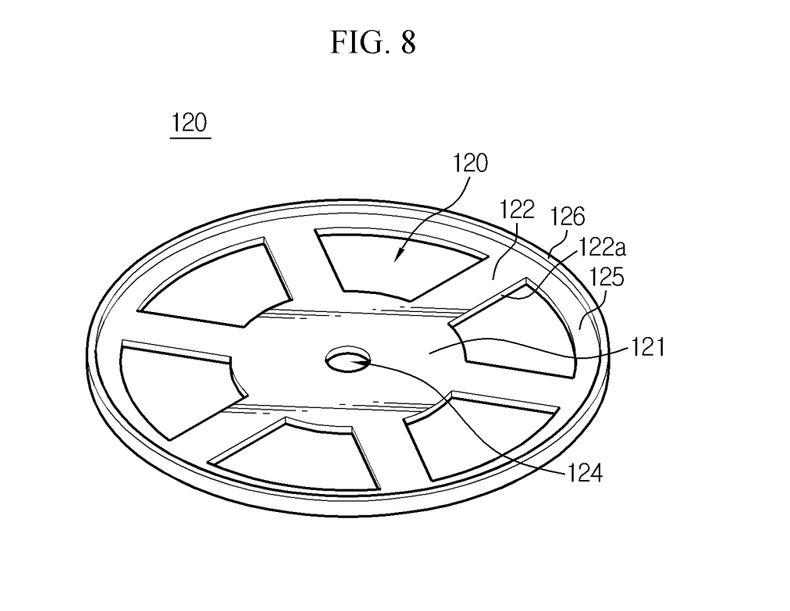
FIG. 8 is a perspective view of FIG. 7.

As shown in FIGS. 7 and 8, the internal terminal 120 further include at least one reinforcing rib 125 connecting the connection ribs 122 to each other. The reinforcing rib 125 provides a function of regulating a contact area with the electrode leads 110 together with a reinforcement function for the internal terminal 120. Preferably, the reinforcing rib 125 is integrally formed with the connection ribs 122 and extends circularly in the circumferential direction of the internal terminal 120 to connect the plurality of connection ribs 122 to each other.

Figure 9:
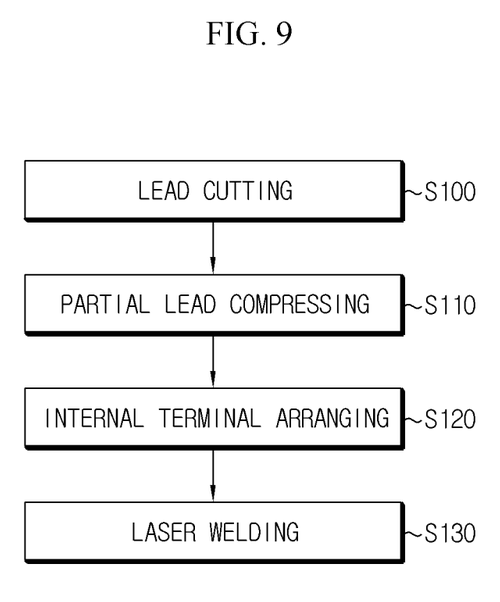
FIG. 9 is a flowchart for illustrating a process of manufacturing an electric energy storage device according to an embodiment of the present disclosure.

FIG. 9 shows a main process for manufacturing an electric energy storage device according to an embodiment of the present disclosure.

Referring to FIG. 9, in the method of manufacturing an electric energy storage device according to an embodiment of the present disclosure, first, a jelly-roll-type cell assembly 100 is prepared, and then processes such as a lead cutting process (Step S100), a partial lead compressing process (Step S110), an internal terminal arranging process (Step S120), and a laser welding process (Step S130) are performed in order.

Figure 10:
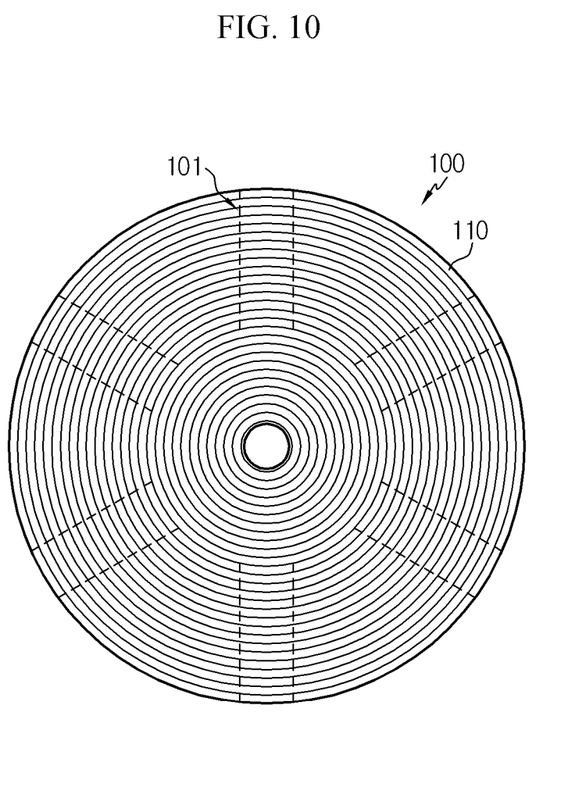
FIG. 10 is a plane view schematically showing an example where a lead of a cell assembly is partially cut corresponding to a side of a connection rib.

In the lead cutting process (Step S100), by using a predetermined cutting device, as shown in FIG. 10, a portion 101 of the electrode lead 110 corresponding to both side surfaces 122a of the connection rib 122 of the internal terminal 120 is cut, and the electrode lead 110 corresponding to the support 121 proceeds to a following process without being cut.

Figure 11:
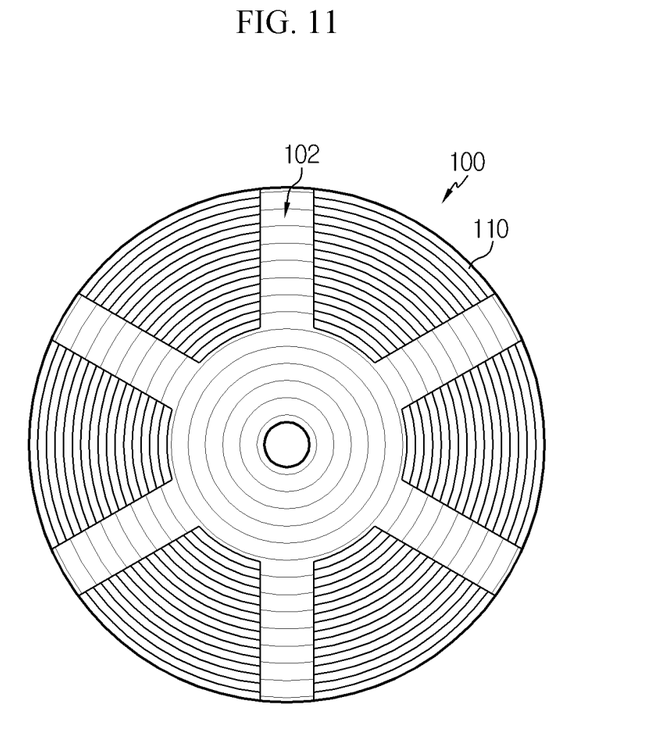
FIG. 11 is a plane view schematically showing an example where the lead of the cell assembly is compressed.

In the partial lead compressing process (Step S110), a physical pressure is applied to the partially cut region by using a predetermined pressing device to form a compressed portion 102 as shown in FIG. 11. Here, the overall shape of the compressed portion 102 coincides with the shape of the internal terminal 120.

Figure 12:
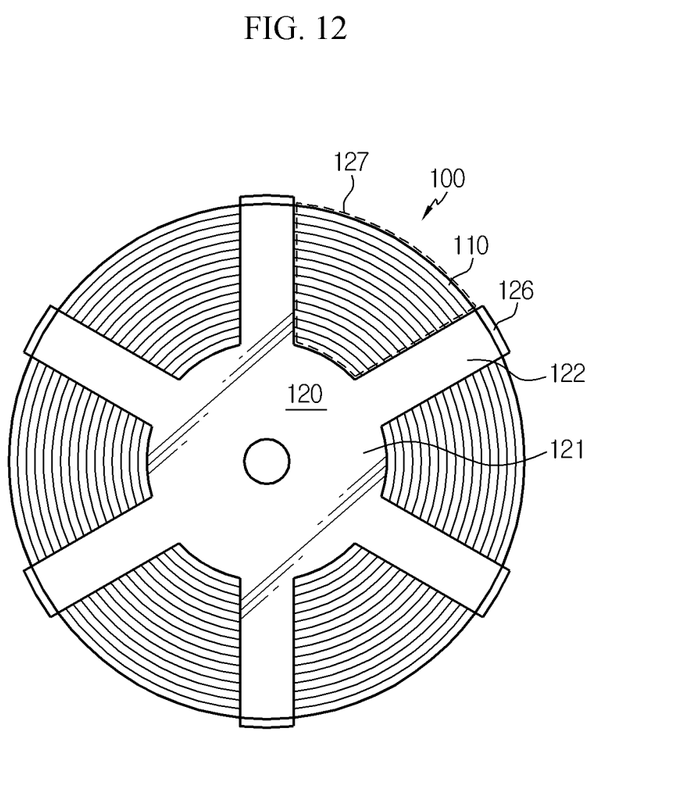
FIG. 12 is a plane view showing an example where the internal terminal is disposed at the compressed portion of the lead depicted in FIG. 9.

In the internal terminal arranging process (Step S120), as shown in FIG. 12, the internal terminal 120 is placed at the compressed portion 102. At this time, the portion of the electrode lead 110 other than the compressed portion 102 passes through the empty spaces 123 between the connection ribs 122 formed at the internal terminal 120, thereby maintaining the shape thereof without being pressed by the internal terminal 120. Here, in the internal terminal 120, the number and area of the connection ribs 122 should be are determined to maintain the shape of the electrode leads 110 as much as possible and have an appropriate contact area with respect to the electrode lead 110. Considering the contact resistance characteristics between the internal terminal 120 and the electrode leads 110, the contact area of the internal terminal 120 contacting the electrode leads 110 may be 60% or above of the entire sectional area of the electrode lead 110 exposed out of the cell assembly 100. If the contact area is less than 60%, the contact resistance between the internal terminal 120 and the electrode leads 110 is excessively increased.

In the laser welding process (Step S130), laser welding is performed to the support 121 and the connection ribs 122 of the internal terminal 120 to completely couple between the internal terminal 120 and the electrode leads 110.

After the internal terminal 120 and the electrode leads 110 are completely coupled as described above, the external terminal 130 is coupled to the outside of the internal terminal 120, and the electric energy storage device is sealed after assembling and curling the metal case 150.

Even though it has been illustrated in the present disclosure that after the lead cutting process (Step S100) is performed, the partial lead compressing process (Step S110) is performed and then the internal terminal arranging process (Step S120) is performed. However, it is also possible that after the lead cutting process (Step S100), the internal terminal arranging process (Step S120) may be performed by partially compressing the leads using the internal terminal 120 without the partial lead compressing process (Step S110).

As described above, in the electric energy storage device according to the present disclosure, the shape of a part of the electrode leads 110 may be maintained when the internal terminal 120 and the electrode leads 110 are coupled, and thus electrolyte penetration and internal gas release may be smoothly performed, which is a remarkable effect.

Although the present disclosure has been described by way of the limited embodiments and drawings, the present disclosure is not limited thereto, and it will be understood by those skilled in the art that various modifications and changes can be made without departing from the scope of the appended claims. For example, even though it has been illustrated and explained in the above embodiments and the accompanying drawings that the internal terminal 120 and the electrode leads 110 are disposed at the upper side of the metal case 150, the structure and the coupling relation of the internal terminal 120 and the electrode leads 110 are also applicable to an internal terminal and electrode leads disposed at the lower side of the metal case 150.

INDUSTRIAL APPLICABILITY

If the present disclosure is applied, it is possible to implement an electric energy storage device with improved process efficiency and safety by means of enhanced electrolyte impregnation and internal gas release performance.

What is claimed is:

1. An electric energy storage device in which a cell assembly having electrode leads is installed in a metal case, the electric energy storage device comprising:
    an internal terminal formed with a support, connection ribs and through portions so that lower surfaces of the support and the connection ribs come into contact with a part of the electrode leads; and
    an external terminal disposed out of the internal terminal to contact the internal terminal, the external terminal being exposed out of the metal case,
    wherein the electrode leads include a first part compressed by the support and the connection ribs of the internal terminal and a second part inserted into the through portions of the internal terminal to maintain a shape thereof,
    wherein the electrode leads are cut at a border portion of the first part and the second part,
    wherein upper ends of the second part of the electrode leads inserted into the through portions of the internal terminal are positioned higher than an upper surface of the internal terminal, at the same point as the upper surface of the internal terminal, or lower than the upper surface of the internal terminal, wherein the support is located at a center of the internal terminal and has a circular shape, wherein the connection ribs are arranged at a periphery of the support at regular intervals with a rod shape to extend radially and one curve is formed between adjacent the connection ribs, wherein the plurality of connection ribs have flanges formed at ends thereof, wherein the flanges wrap a lower edge of the external terminal, wherein an upper end of the metal case is curled inward to fix the external terminal, and wherein a contact area of the internal terminal contacting the electrode lead is 60% or above of an entire sectional area of the electrode lead.

2. The electric energy storage device according to claim 1, wherein an electrolyte impregnation hole is formed at a center of the support.

3. The electric energy storage device according to claim 1, further comprising: at least one reinforcing rib extending in a circumferential direction of the internal terminal to connect the connection ribs to each other.

* * * * *